(12) United States Patent
Pote et al.

(10) Patent No.: US 7,814,848 B2
(45) Date of Patent: Oct. 19, 2010

(54) SYSTEM FOR DISTRIBUTING POULTRY LITTER BELOW THE SOIL SURFACE

(75) Inventors: Daniel H. Pote, Booneville, AR (US); Stephen M. Haller, Magazine, AR (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 12/494,490

(22) Filed: Jun. 30, 2009

(65) Prior Publication Data

US 2010/0003087 A1 Jan. 7, 2010

Related U.S. Application Data

(60) Provisional application No. 61/133,877, filed on Jul. 2, 2008.

(51) Int. Cl.
| | |
|---|---|
| A01C 7/08 | (2006.01) |
| A01C 17/00 | (2006.01) |
| B67B 7/00 | (2006.01) |
| G01F 11/00 | (2006.01) |
| G01F 11/20 | (2006.01) |

(52) U.S. Cl. .......................... 111/130; 111/900; 222/1; 222/413; 222/608; 239/675

(58) Field of Classification Search ................. 239/662, 239/663, 670, 675, 289; 222/608–610, 1, 222/413; 111/200, 900, 130
See application file for complete search history.

(56) References Cited

U.S. PATENT DOCUMENTS 4,234,109 A * 11/1980 Goodhart .................... 222/609

5,810,475 A * 9/1998 St. Ama ...................... 366/192

OTHER PUBLICATIONS

Pote, D.H. et al., "Water-Quality Effects of Incorporating Poultry Litter into Perennial Grassland Soils", J. Environ. Qual., 32, 2003, pp. 2392-2398.

Moore, Jr., Philip A., et al., "Evaluation and Management of Ammonia Emmissions from Poultry Litter", Jun. 5-8, 2006, pp. 304-310 in Proceedings of Workshop on Agricultural Air Quality, State of the Science, Potomac, MD.

Pote, D.H., et al., "Protecting Water Quality by Incorporating Poultry Litter into Perennial Pastures", In Soil and Water Conservation Society Annual Meeting Abstracts, Soil and Water Conservation Society, Ankeny, IA 2001.

(Continued)

*Primary Examiner*—Christopher J. Novosad
(74) *Attorney, Agent, or Firm*—John Fado; Randall E. Deck; Lesley Shaw (57) ABSTRACT

Biodegradable solid soil amendment material such as poultry litter may be disposed of in soil using an apparatus which includes a soil cutter for cutting a trench and a dispenser for transporting the material and simultaneously grinding or shearing the material and distributing it to the trenches in the soil. The receptacle includes a plurality of troughs across its bottom surface, each having an outlet at one end thereof, and corresponding screw augers therein for distributing and transporting the material to the outlets. As the material is transported toward each of the outlets by the augers it is crushed or ground to a small size. This apparatus allows the material to be dispensed through the multiple outlets at a substantially steady, uniform rate.

26 Claims, 7 Drawing Sheets

OTHER PUBLICATIONS

Pote, D.H. et al., "Incorporating Poultry Litter into Perennial Grassland Soils: Forage Production Effects", In Soil and Water Conservation Society Annual Meeting Abstracts. Soil and Water Conservation Society, Ankeny, IA 2003. In Southern Branch Agronomy Abstracts, ASA, Madison, WI 2004.

Pote, D.H. et al., "Incorporating Poultry Litter into Perennial Grassland to Improve Water Quality", Arkansas Water Resources Conf., Abstracts., 2006 Conference, Fayetteville, AR.

* cited by examiner

SYSTEM FOR DISTRIBUTING POULTRY LITTER BELOW THE SOIL SURFACE

CROSS-REFERENCE TO RELATED APPLICATION

This application claims the benefit under 35 U.S.C. 1.19(e) of U.S. provisional No. 61/133,877, filed Jul. 2, 2008, the contents of which are incorporated by reference herein.

BACKGROUND OF THE INVENTION

1. Field of the Invention

The invention is drawn to an apparatus and method for dispensing biodegradable soil amendment materials and improving soil quality.

2. Description of the Prior Art

Excessive nutrient losses cost producers substantial income, and severely degrade air and water quality in many watersheds with intensive agricultural production. Research has shown that nutrient losses from fertilizers applied to farmland are minimized if the fertilizer is incorporated beneath the soil surface. As a result, dry fertilizers have commonly been incorporated in tilled agricultural systems, but this has not been applicable to perennial pastures and other no-till systems that permit only very limited disturbance of the soil surface. Subsurface application of fertilizer (poultry litter, etc.) in no-till systems can theoretically be achieved by cutting narrow trenches (generally approximately 2-6 cm wide and 4-12 cm deep) in the soil surface and placing fertilizer in the trenches before covering them with soil. However, this has never been a practical option because no one has previously devised a machine that is capable of taking bulky soil amendments that have highly variable particle size and directing a consistent steady flow of the material into such small trenches. Poultry litter (manure mixed with bedding material) is a good example of a common fertilizer amendment that has very inconsistent composition, with particle size ranging from microscopic to large chunks (>50 cm diameter), debris such as dead bird carcasses, and generally low (but variable) moisture content.

SUMMARY OF THE INVENTION

We have now invented an apparatus and method for dispensing biodegradable solid soil amendment materials such as poultry litter in soil. The apparatus includes a soil cutter for cutting a trench and a dispenser for transporting the material and simultaneously grinding or shearing the material and distributing it to the trenches in the soil. The receptacle includes a plurality of troughs across its bottom surface, each having an outlet at one end thereof, and corresponding screw augers therein for distributing and transporting the material to the outlets. As the material is transported toward each of the outlets by the augers the material is crushed or ground to a small size. This apparatus allows the material to be dispensed through the multiple outlets at a substantially steady, uniform rate.

In accordance with this discovery, it is an object of this invention to provide a method and apparatus for the disposal of biodegradable solid soil amendment material as an alternative to landfill disposal.

Another object of this invention is to provide a method and apparatus for the disposal of biodegradable solid soil amendment material onto agricultural land to improve the quality of the soil for subsequent crop or plant production.

Yet another object of this invention is to provide a method and apparatus for dispensing solid soil amendment material onto soil which is effective for grinding or crushing soil amendment material of a large and/or highly variable size to substantially uniform small particles which may be readily dispensed into small trenches.

Still another object of this invention is to provide a method and apparatus for dispensing solid soil amendment material which is of a large and/or variable size which effectively grinds or crushes the material to small particles and dispenses this material onto the soil through multiple outlets and onto multiple trenches at a substantially steady, uniform rate.

A further object of this invention to provide a method and apparatus for the disposal of soil amendment material such as untreated poultry litter.

Other objects and advantages of the invention will become apparent from the ensuing description.

DETAILED DESCRIPTION OF THE INVENTION

The apparatus of this invention was designed for dispensing a variety of biodegradable solid soil amendment materials by forming trenches in the soil and dispensing the material therein. Without being limited thereto, the apparatus is suitable for dispensing soil amendments including inorganic or organic fertilizers, waste material, and organic matter such as chicken litter, animal or plant waste, fly ash, and cellulosic material such paper, cardboard and insulation. However, the apparatus is particularly useful for the disposal of waste materials such as poultry litter which comprise a crude mixture of non-uniform size components. Waste poultry litter is a mixture of manure with bedding material, but generally has a very inconsistent composition, with particle sizes ranging from microscopic to large pieces or clumps (>50 cm diameter), which may even include debris such as dead bird carcasses, and generally has a low but variable moisture content. The apparatus includes a novel dispensing system which is effective for crushing or grinding this waste material to small particles and uniformly distributing this material into the multiple trenches cut into the soil.

While the soil amendment material may be dispensed in urban or rural locations, in accordance with a preferred embodiment the material is dispensed on agricultural land and fields, including pastures, fields used for production of row-crops, including organic, tilled and no-till systems, nurseries, and ornamentals. The addition of organic matter to the soil as described herein provides the added benefit of improving the soil physical and chemical qualities for supporting plant growth.

Figure 1:
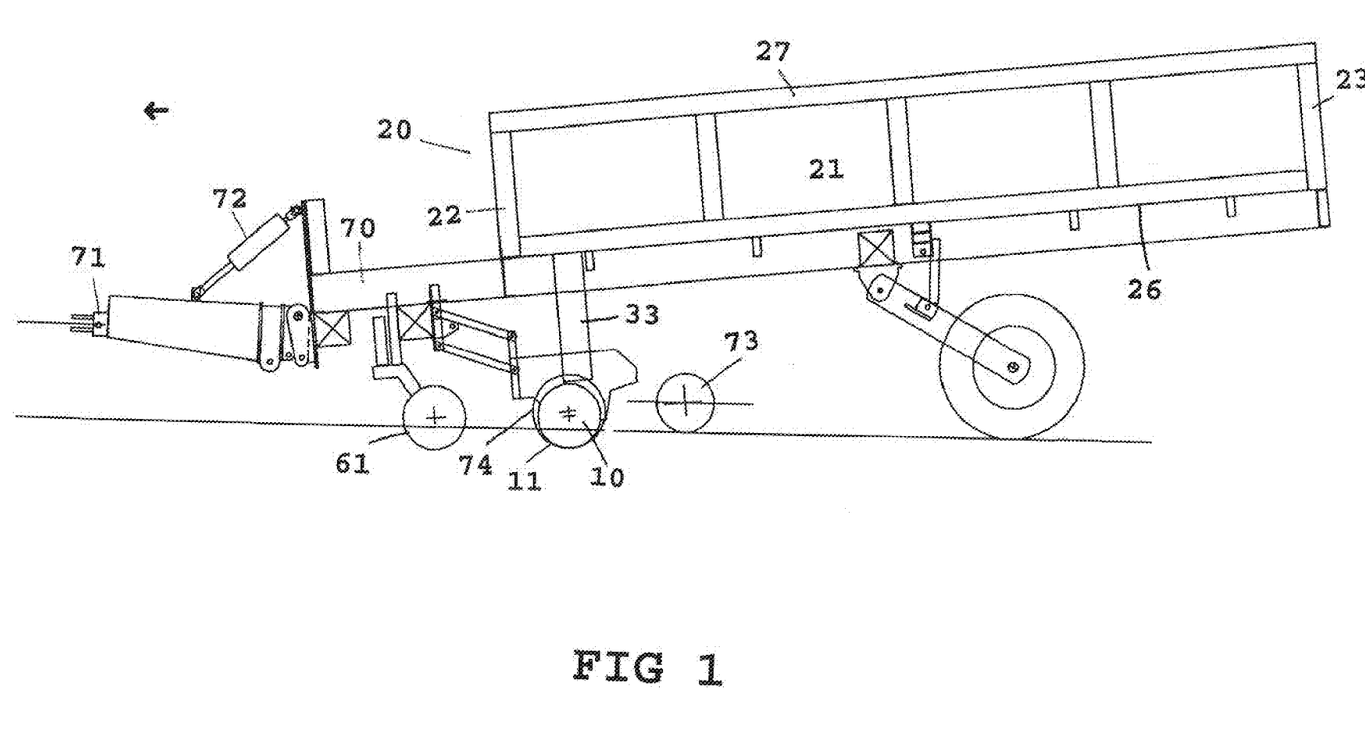
FIG. 1 is a side view of the apparatus of the invention in use for dispensing soil amendment material into the soil, with the cutting blades lowered, engaging the soil to cut trenches therein.
Figure 2:
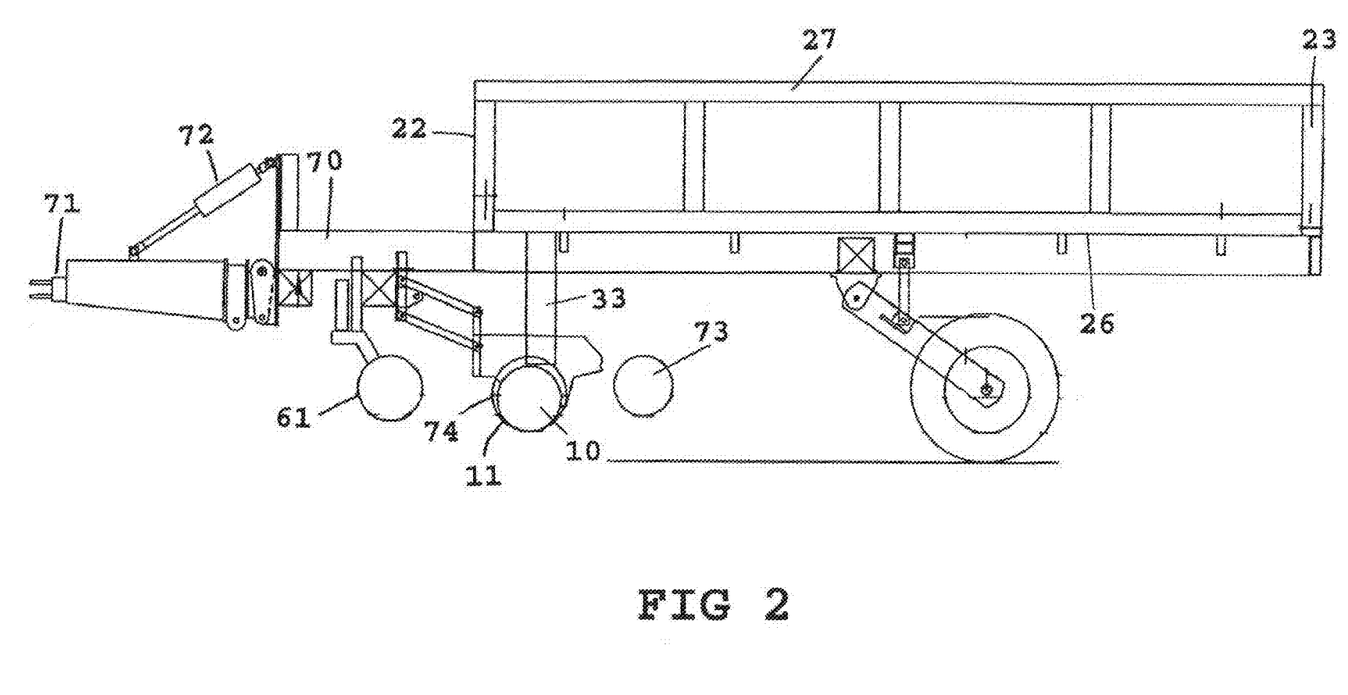
FIG. 2 is a side view of the apparatus of FIG. 1 while not in use, raised with the cutting blades above the soil.
Figure 6:
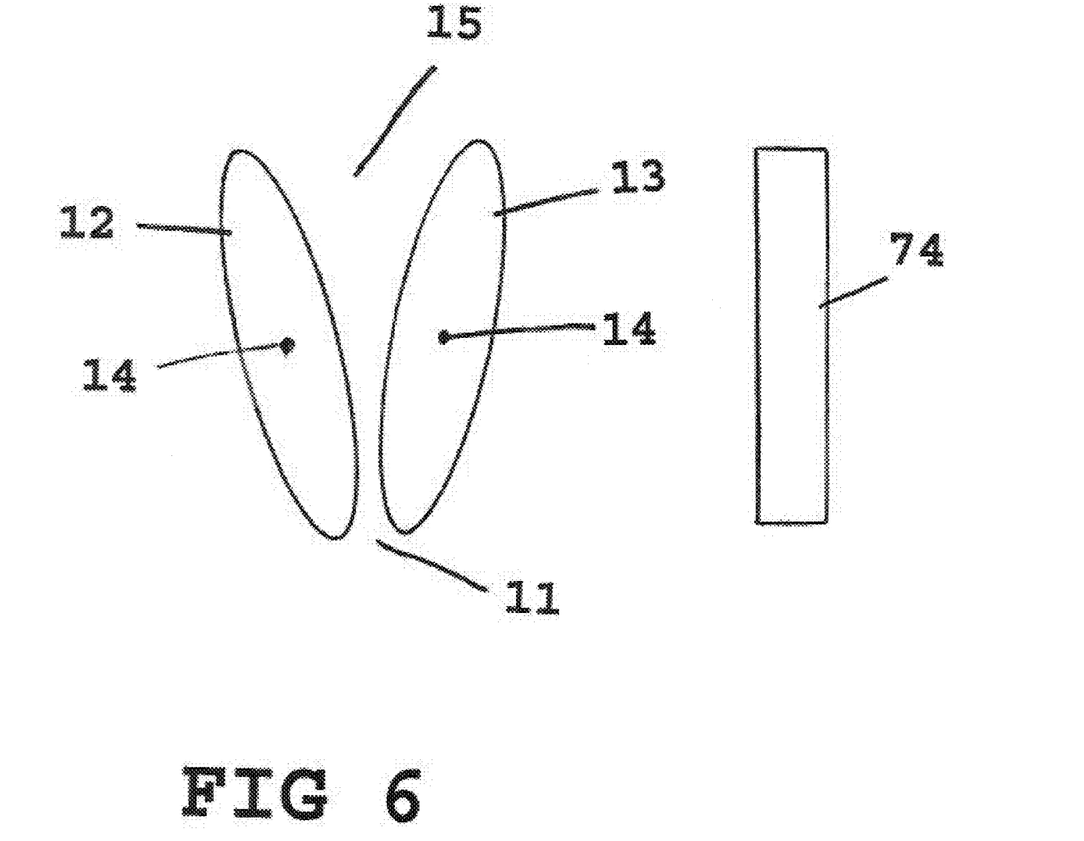
FIG. 6 is a top view of one embodiment of the soil cutting blades of the apparatus of the invention.

Referring now to FIGS. 1 and 2, the apparatus includes a plurality of soil cutting blades 10, which each include a leading edge 11 effective to cut a trench or furrow when lowered into the ground and drawn therethrough in the direction of travel indicated by the arrow in FIG. 1. The cutting blades are laterally disposed across the width of the device, substantially perpendicular to the direction of travel. The particular soil cutting blade used is not critical, and a variety of soil cutting implements are suitable for use herein, including but are not limited to disks, coulters, rippers, knives, chisel pows, shanks, and cultivator shovels. For use in fields practicing no-till systems, the cutting blades preferably cut or open a narrow trench in the soil, but do not turn the soil. In accordance with one preferred embodiment for no-till operations, the soil cutting blades are constructed as "double disks," each including a pair of spaced apart, upright (approximately vertical) disks 12 and 13 shown in detail in FIG. 6. Disks 12 and 13 are angled toward one another, with their axis 14 disposed at an obtuse angle, such that the leading edge 11 of each disk in the pair are adjacent at a point both facing the direction of travel and downward toward the soil. In this configuration, the disks 12 and 13 form a gap 15 therebetween opening at their rear edges, away from the direction of travel. When the cutting blades are lowered in engagement with the soil as shown in FIG. 1, the leading edges 11 of the disks cut a narrow trench, and the waste material is then preferably deposited into this trench through the gap 15.

The soil amendment material to be deposited into the soil behind the cutting blades is transported and distributed by a dispenser 20, positioned behind and/or above the soil cutting blades 10. The dispenser 20 includes a receptacle 21, such as a hopper or bin, holding the material prior to deposit in the trench. The receptacle includes opposed front and rear walls (relative to the direction of travel) 22 and 23, respectively, and opposed side walls 24 and 25, and a lower surface 26 extending between these walls. For the purposes of description herein, the receptacle has a length defined as the distance between the front and rear walls parallel to the direction of travel, and a width defined as the distance between the side walls perpendicular to the path of travel. The receptacle includes an inlet 27 for the material, typically an open top. The size and shape of the receptacle is not critical, and may be polygonal or ovoid, and the walls may be substantially vertical or sloped. However, for ease and simplicity of construction, the receptacle is preferably rectangular. In an optional, preferred embodiment the front and/or rear walls may include openable/closable access panels, as may the lower surface 26 for ease of unloading.

Figure 3:
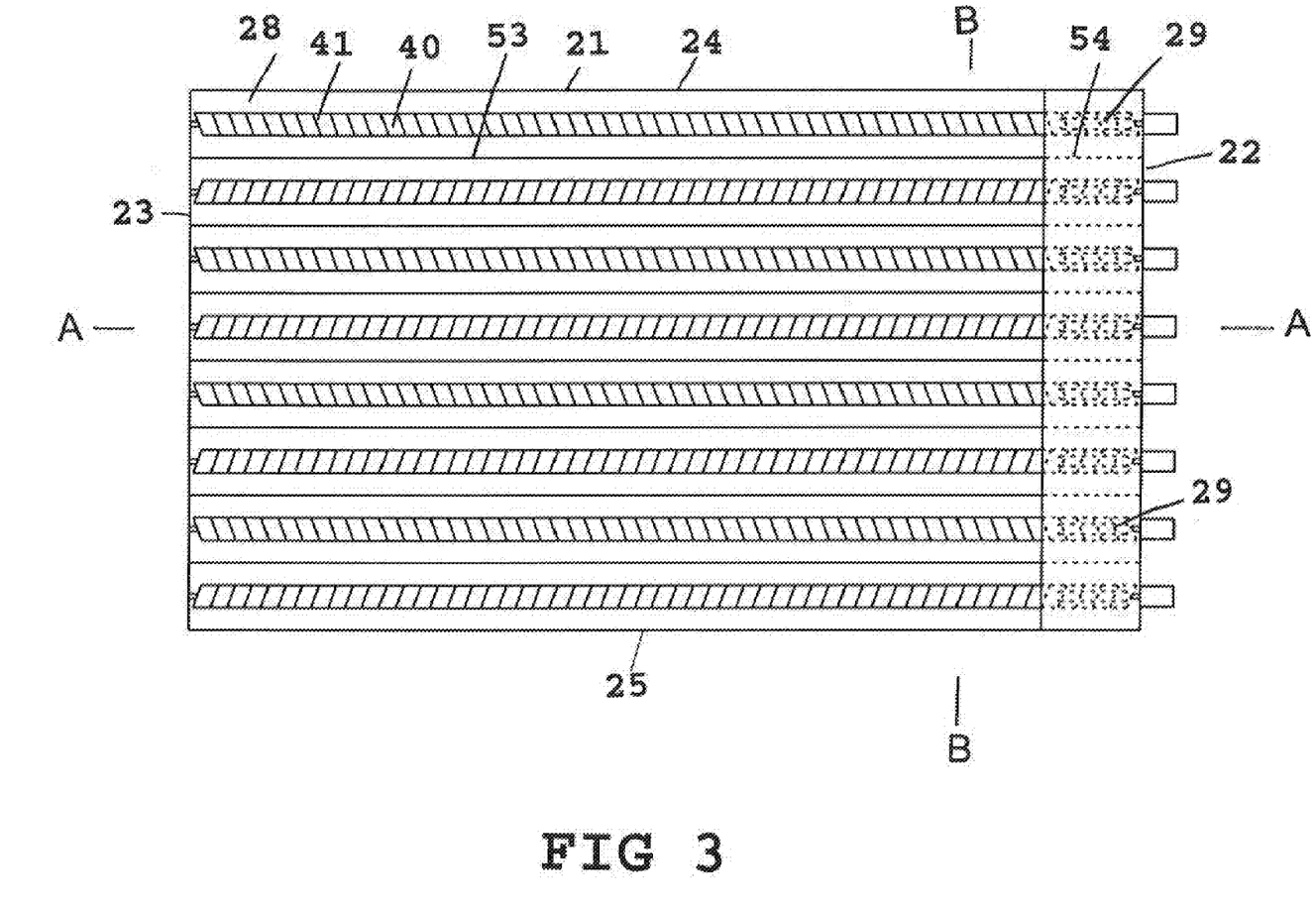
FIG. 3 is a top view of the receptacle of FIG. 1.
Figure 4:
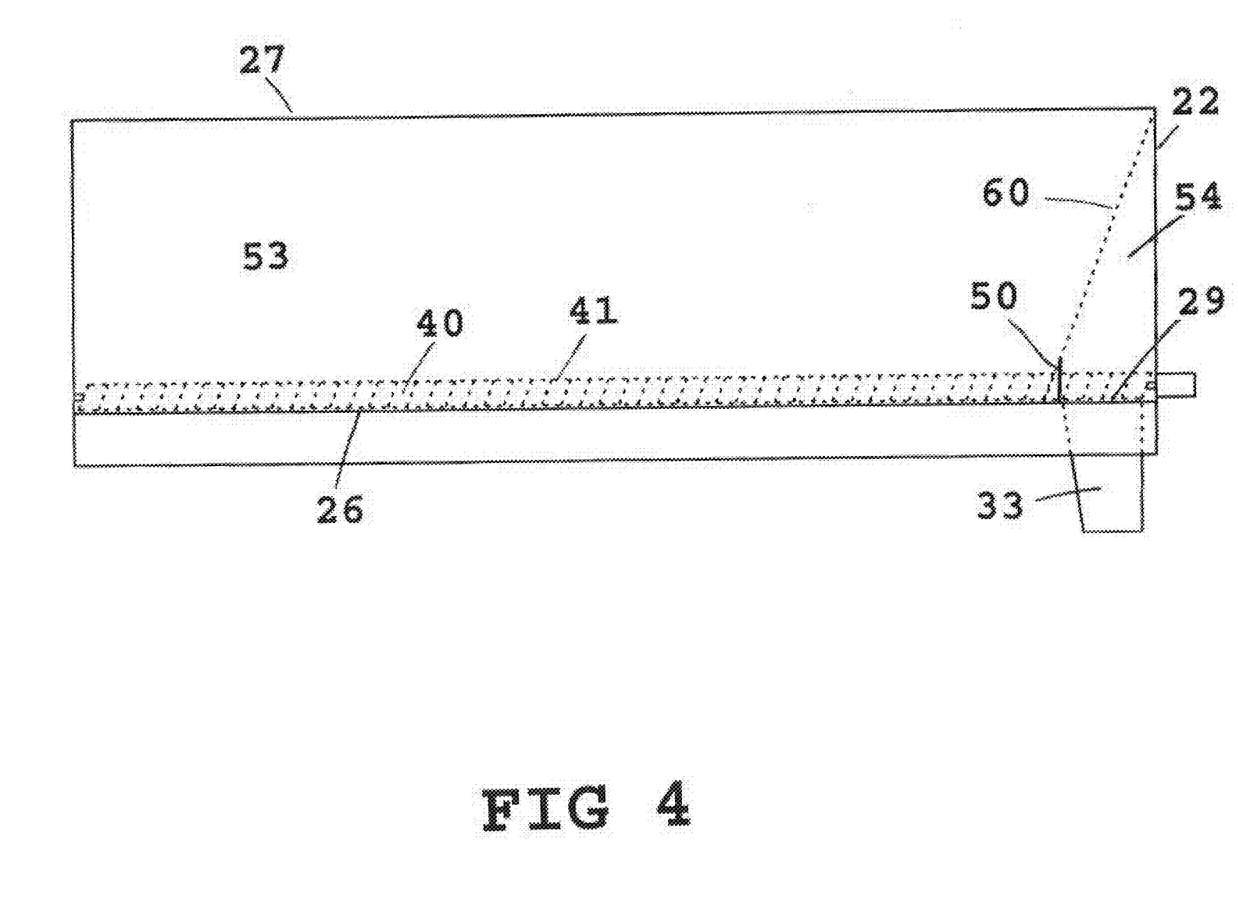
FIG. 4 is a side view A-A through the receptacle of FIG. 3.
Figure 5:
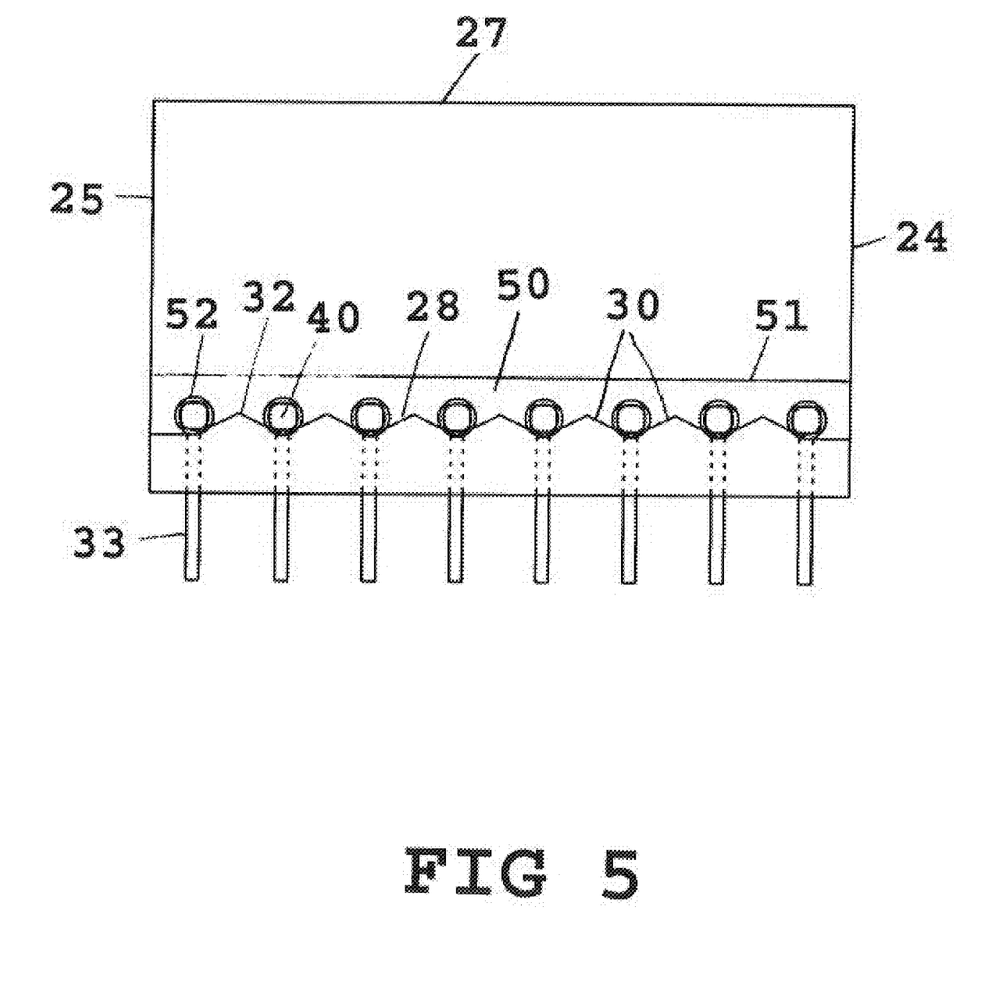
FIG. 5 is a front view B-B through the receptacle of FIG. 3.
Figure 7:
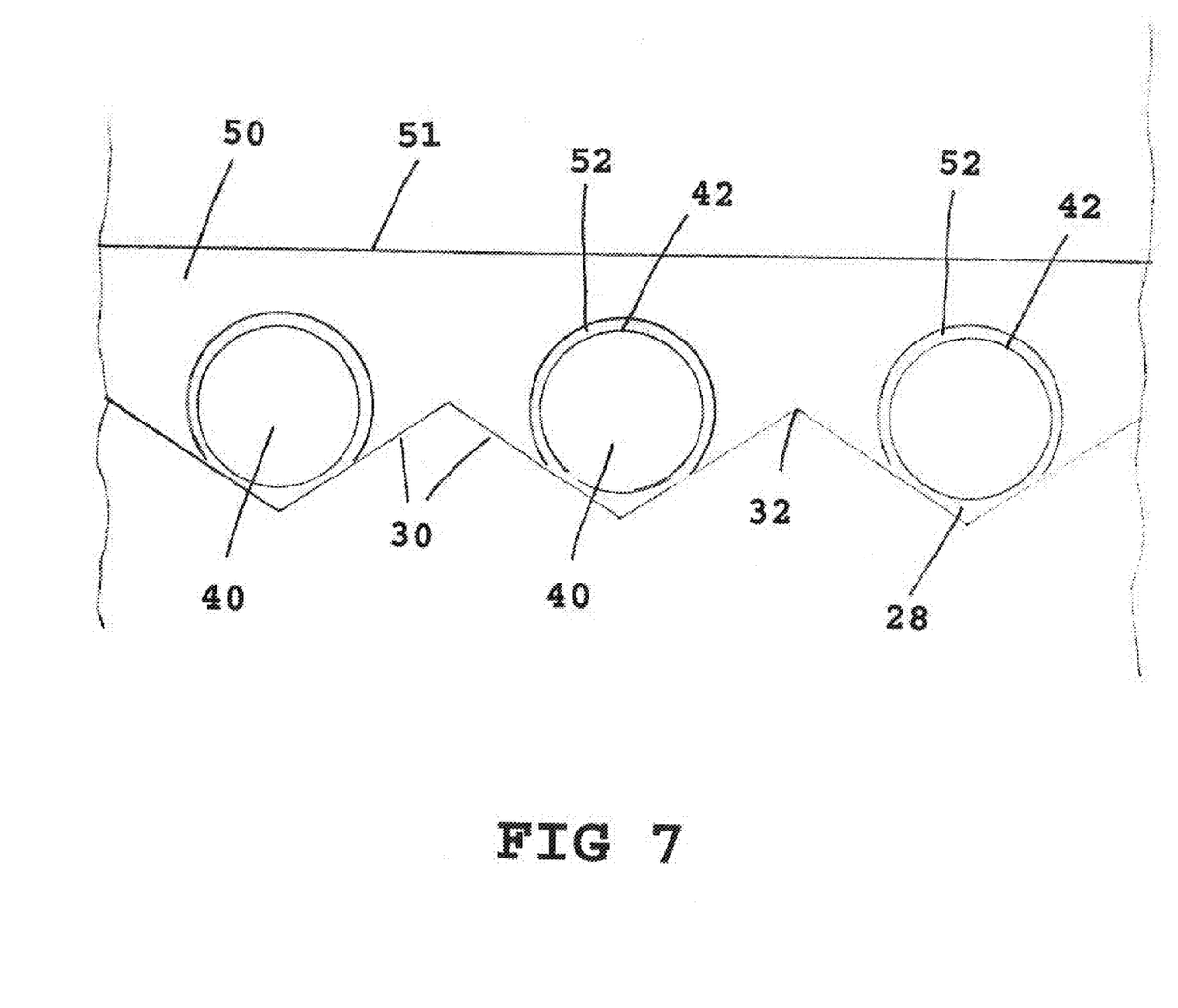
FIG. 7 is a partial close-up front view through the receptacle showing the face plate with the augers passing therethrough.

To distribute the material within the dispenser to all of the trenches, the lower surface 26 includes a plurality of substantially parallel elongated troughs 28 disposed substantially longitudinally along the length thereof, substantially traversing the length of the lower surface between the front and rear walls (FIGS. 3-5). Each of the troughs 28 include an outlet 29 at the bottom thereof, positioned adjacent (near) to the front wall, and rearward of and over the path of travel of one of the cutting blades (i.e., the troughs and the outlets are positioned in a vertical plane approximately extending through the cutting blades and parallel to the direction of travel). In the preferred embodiment using the above-mentioned double disk cutting blades, the outlet is disposed above said gap 15 to dispense material directly into the trench while the disks 12 and 13 prevent soil from falling into and closing the freshly opened trench. Although the openings are shown as being disposed adjacent to the front wall 22, it is understood that they may alternatively be disposed adjacent the rear wall 23, provided that they remain disposed rearward of and over the path of travel of one of the cutting blades such that the material is deposited into the trench and the direction of rotation of the screw augers is reversed to transport the material toward the outlet at this location. The side walls 30 of the troughs are preferably downwardly inclined toward one another to assist in gravity flow toward the screw auger 40 as most clearly shown in FIGS. 5 and 7. The side walls of adjacent troughs are preferably joined at their top edges at an angled crest or peak 32 to prevent dead spots. Large substantially horizontal spaces between adjacent troughs would favor the formation of dead spots where material could accumulate. An optional, yet preferred chute 33 is also provided extending downwardly from each outlet 29 to assist in directing the material into the trenches.

Transport of the material along the length of the troughs 28 is effected by screw augers or feed screws 40 disposed in each of the troughs 28, which augers turn in a direction to carry the material toward the outlets 29. Not only do the augers 40 transport the material in a direction toward the outlets, but they provide the added effect of grinding or shearing the material as it is transported. Grinding and/or shearing of the material by the augers is essential when using material which is of a large and/or variable size such as poultry litter, to reduce the material to small particles and thereby allow the material to be dispensed to all of the trenches at a substantially steady, uniform rate. The screw auger is constructed with substantially helical screw blades or flighting 41, similar to an Archimedes screw, with the screw blades terminating at their outer, radial edge 42. In an optional yet preferred embodiment, the blades 41 of the screws are removed or are not provided at the downstream end thereof (relative to the direction of transport of the material in the trough) which is adjacent to the front wall 22 (or the rear wall 23 in the event that the outlets 29 are adjacent to it). The distance along the screw without the blades is selected to be effective to prevent or reduce the buildup of material against the wall as it is transported down the troughs, and is preferably, but not limited to, about 2 to 4 inches.

The number of cutting blades 10 and corresponding troughs 28 and screw augers 40, and the size of the troughs and augers, is not critical and may be readily determined by the skilled practitioner. However, as a practical matter, their number and size should be sufficient to extend laterally substantially between the side walls 24 and 25 of the receptacle (across its width) to minimize the formation of dead zones. By way of example and without being limited thereto, when using approximately 3 to 4 inch diameter screw augers disposed in parallel relationship with their axis approximately 6 to 12 inches apart, the device includes at least 2, and preferably 6, 8 or more each of the cutting blades and their corresponding troughs and screw augers, and the outlets 29 are approximately 1 to 2 inches wide by 12 inches long.

To control flow of the material through the outlets 29, the receptacle includes an upstanding, substantially vertical face plate 50 disposed laterally between the side walls 24 and 25, substantially perpendicular to the length of the troughs 28, and on the upstream side of the outlets 29 (relative to the direction of transport of the waste in the troughs). The face plate extends downwardly such that its bottom edge is adjacent (near) the surface of the troughs 28, and terminates at an upper edge 51 disposed above the uppermost or outer radial edge 42 of the auger blades. The face plate is provided a plurality of restrictive openings 52 to accommodate passage of the screw augers 40 therethrough, shown in FIGS. 5 and 7. In extending across the width of the receptacle, the face plate defines or separates the receptacle into first and second volumes 53 and 54, respectively. The first volume 53 is upstream of the face plate (relative to the direction of transport of the material) and serves as the reservoir into which the material is initially deposited, and the second volume 54 is downstream of the face plate and encompasses the outlets 29. Thus, in a typical configuration wherein the outlets 29 are disposed adjacent to the front wall 22 and the screw augers transport material thereto, the second volume is between the front wall and the face plate. However, in the alternative embodiment wherein the outlets 29 are disposed adjacent to the rear wall 23 and the screw augers transport material in thereto, the second volume is between the rear wall and the face plate.

The face plate 50 effectively controls access to the outlets 29 from the first volume, and prevents material from passing through the outlets without first passing through the restrictive openings 52 and being contacted by and subjected to grinding or shearing action and size reduction of large particles. This promotes a steady, substantially uniform flow of material through each of the outlets, prevents or reduces blockage of the outlets, and reduces particle size to more readily fall into the trench cut into the soil. The size and shape of the openings 52 through the face plate 50 are preferably selected to be only slightly larger than the blades 41 of the screw augers, thereby effectively substantially preventing large pieces of the material from passing between it and the outer radial edge 42 of the blades. To this end, the openings are preferably substantially semicircular, with a diameter which is less than 2 inches greater than the diameter of the augers, more preferably with a diameter which is less than 1 inch greater than the diameter of the augers. With the receptacle divided into two volumes by the face plate as described, we have found that within the first volume 53, the side walls 30 of the troughs preferably have a sufficiently narrow pitch that the crest 32 adjoining these side walls is disposed at a height below the uppermost radial edge 42 of the augers 40. This low profile of the troughs prevents or minimizes the formation of bridges of material above the augers. Because the material is necessarily ground or sheared prior to entering the second volume 54 and is therefor less susceptible to the formation of bridges, within this second volume the crest 32 may disposed above the uppermost radial edge of the augers.

In an optional, yet preferred embodiment, the dispenser also includes a cover plate 60 extending over (above) the second volume 54 and the outlets 29, from the face plate to the front wall 22 (or the rear wall 23 in the event that the outlets are disposed adjacent to the rear wall) and across the width of the receptacle between the side walls 24 and 25. This cover plate prevents material from being initially dispensed or falling into the second volume 54 without passing through the above-mentioned restrictive openings 52. The cover plate 60 is preferably disposed at an angle sloping toward the first volume 53 such that any material thereon will fall into the first volume, and may also be hinged to provide ready access to the augers and outlets within the second volume for maintenance or cleaning. In an alternative embodiment, the cover plate 60 or at least a portion thereof adjacent to face plate 50 may be substantially vertical or even sloped away from first volume 53 (toward second volume 54). Positioning the cover plate 60 in this manner may minimize compaction of litter in the first volume 53 if the first volume is filled to near its top.

In another preferred embodiment, the device may include an optional trench closer 73 disposed rearward of each of the soil cutting blades 10 and outlets 29, in a vertical plane extending through the cutting blades and outlets and parallel to the direction of travel. The trench closer should be effective to remove soil displaced outwardly by the cutting blades back over the trench after the material has been deposited therein. A variety of devices are suitable for use herein, including a pair of horizontal graders, blades or disks forming an acute angle with the trench to deflect or funnel soil lying on the surface over the trench. In another optional, but preferred embodiment, a mower or coulters 61, such as are conventional in the art, may be included on the apparatus forward of the cutting blades 10 when treating ground covered with heavy vegetation or other trash.

To move the apparatus across a field, in a preferred embodiment the apparatus is constructed as a field-going machine having frame 70 for carrying the above-mentioned cutting blades 10, dispenser 20 and other optional components, and also including a means for providing power to drive the components, particularly the augers 40. As shown in FIGS. 1 and 2, the apparatus may include a ground traversing carriage to which the frame 70 is attached, and which may be connected to any suitable vehicle, such as a tractor, with a hitch 71. In this embodiment, the carriage may include a self-contained lifting mechanism 72 for raising and lowering the apparatus. Without being limited thereto, suitable lifting mechanisms include pneumatic or hydraulic cylinders as are conventional in the art. As shown in FIG. 1, when the cylinder 72 is in a retracted position, the front of the apparatus is lowered, allowing the cutting blades 10 to contact the soil. In contrast, when the cylinder 72 is extended as shown in FIG. 2, the front end is raised out of contact with the soil. Alternatively, the frame 70 may include a bracket (not shown) for mounting the apparatus to a suitable vehicle from which the apparatus is suspended. Movement of the apparatus between a raised position for transportation and storage and a lowered position for engaging the ground may be accomplished by a conventional lifting device on the vehicle. In either of these embodiments, power to operate the components may include a suitable power take-off mechanism for connection to the tractor or vehicle as is conventional in the art, or a self-contained power source such as a diesel or gasoline engine, or electric engines drawing energy from the vehicle. The practitioner skilled in the art will recognize that the power supply should include suitable drive belts, gears, or other conventional drive mechanisms for connection between the power source and the moving components. In another preferred embodiment shown in FIGS. 1 and 2, the frame 70 includes support wheels 74 adjacent (near) the front end thereof such that they engage the ground when the front end is lowered. The height of the wheels is adjustable, thereby allowing ready control of soil cutting depth by the cutting blades. In addition, the height and position of the wheels 74 are also preferably selected effective to dispose the lower surface 26 and troughs 28 at an incline toward the front wall when the wheels are in contact with the ground. The troughs and lower surface are essentially horizontal when the apparatus is being moved to a site of application as in FIG. 2. However, inclination of the apparatus when the frame is lowered for field application of the material, as in FIG. 1, facilitates the transport of the material to the front of the device, increasing the downward pressure on the cutting blades for improved soil contact.

During operation, soil amendment material such as dry poultry litter is deposited into the first volume 53 of the receptacle 21 at a poultry production site or other loading facility. At the desired agricultural field, the frame 70 is lowered from its transportation position (FIG. 2) such that the cutting blades 10 contact and penetrate the ground to the desired depth as the apparatus is moved or pulled across the field (FIG. 1). At substantially the same time, rotation of the augers 40 is initiated, transporting material from the first volume along the troughs 28 and through the restrictive openings 52 in the face plate 50 into the second volume 54. Large particles or clumps of material are simultaneously ground or sheared into smaller particles by the action of the augers in concert with the restrictive openings. We have found that an added advantage of the auger system is the efficient transport of the material in the receptacle from the back to the front, not only ensuring substantially complete dispensing of the material, but also maintaining sufficient weight above the cutting blades to force them into the soil. Depending on the material, the speed of the augers may be slowed to prevent heat buildup, or increased to increase the rate of material application to the soil. Dust production is minimized by the mass of material situated above the bottom mounted augers. As the cutting blades pass through the soil, cutting a plurality of substantially parallel trenches therein, the material is dispensed from the outlets 29, through the chutes 33 and gap 15, into the trenches.

It is understood that the foregoing detailed description is given merely by way of illustration and that modifications and variations may be made therein without departing from the spirit and scope of the invention.

We claim:

1. An apparatus for distributing soil amendment materials comprising:
   a) a plurality of soil cutting blades effective to cut a plurality of substantially parallel trenches in the soil when pulled through the soil in a direction of travel;
   b) a dispenser for delivering soil amendment material to the trench cut in the soil rearward of said cutting blades, wherein said dispenser comprises:
      1) a receptacle comprising opposed front and rear walls and opposed side walls, an inlet for said material, and a lower surface extending between said walls;
      2) said lower surface comprising a plurality of substantially parallel elongated troughs disposed substantially longitudinally along the length thereof, each of said troughs having an outlet at the bottom thereof, wherein each said outlet is positioned adjacent to one of said front wall or rear wall and rearward of and over the path of travel of one of said cutting blades effective to dispense said material to said trench in the soil;
      3) a plurality of screw augers, wherein one said auger is disposed in each of said troughs and said augers are adapted to both transport said material in a direction along the length of said troughs toward said outlets and grind or shear said material as said material is transported;
      4) an upstanding face plate disposed laterally between said side walls substantially perpendicular to said troughs and augers, and on the side of said outlets which is upstream from said direction of transport of said material in said troughs, said face plate defining first and second volumes within said receptacle, said first volume being upstream of said face plate relative to said direction of transport of said material, and said second volume being downstream of said face plate relative to said direction of transport of said material and encompassing said outlets; and
      5) said face plate comprising a bottom edge adjacent said troughs and an upper edge disposed above the uppermost radial edge of said augers, and said face plate further comprising a plurality of openings through which said screw augers pass.

2. The apparatus of claim 1 further comprising a cover plate extending over said second volume and said outlets and between the side walls.

3. The apparatus of claim 2 wherein said cover plate is disposed at an angle sloping toward said first volume.

4. The apparatus of claim 3 wherein said openings through said face plate have a diameter which is less than 1 inch greater than the diameter of said augers.

5. The apparatus of claim 2 wherein said cover plate is hinged.

6. The apparatus of claim 1 wherein said openings through said face plate have a diameter which is less than 2 inches greater than the diameter of said augers.

7. The apparatus of claim 1 wherein the number of said troughs is sufficient to extend laterally substantially between said side walls.

8. The apparatus of claim 7 comprising at least 6 of said troughs and said augers within said receptacle.

9. The apparatus of claim 1 wherein said troughs comprise downwardly inclined side walls.

10. The apparatus of claim 9 wherein said inclined side walls comprise an upper edge, and the upper edges of adjacent troughs merge at a crest, and within said first volume of said receptacle said crest is disposed below the uppermost radial edge of said augers.

11. The apparatus of claim 1 wherein the blades of said augers are not provided at the end adjacent to one of said front or said rear wall downstream of said direction of transport of said material a distance effective to prevent a buildup of material against said front or rear wall.

12. The apparatus of claim 1 wherein at least a portion of said front wall or rear wall which is adjacent to said outlets is openable.

13. The apparatus of claim 1 wherein said outlets further comprise a downwardly extending chute.

14. The apparatus of claim 1 wherein said outlets are disposed adjacent to said front wall and said second volume is between said front wall and said face plate.

15. The apparatus of claim 1 wherein said outlets are disposed adjacent to said rear wall and said second volume is between said rear wall and said face plate.

16. The apparatus of claim 1 wherein said soil cutting blades are selected from the group consisting of disks, coulters, rippers, knives, chisel pows, shanks, and cultivator shovels.

17. The apparatus of claim 16 wherein each of said soil cutting blades comprise a pair of spaced apart, upright disks which are angled toward one another such that said disks comprise adjacent edges facing said direction of travel and downward toward said soil, and form a gap therebetween at the edges of said disk facing away from said direction of travel.

18. The apparatus of claim 17 wherein said outlet is disposed above said gap.

19. The apparatus of claim 1 wherein said plurality of substantially parallel troughs are disposed laterally across said lower surface of said receptacle.

20. The apparatus of claim 1 wherein said inlet for said material is disposed to deposit said material into said first volume.

21. A method for dispensing of soil amendment material to soil comprising:
   (A) providing soil amendment material in an apparatus comprising:
      a) a plurality of soil cutting blades effective to cut a plurality of substantially parallel trenches in the soil when pulled through the soil in a direction of travel;
      b) a dispenser for delivering soil amendment material to the trench cut in the soil rearward of said cutting blades, wherein said dispenser comprises:
         1) a receptacle comprising opposed front and rear walls and opposed side walls, an inlet for said material, and a lower surface extending between said walls;

2) said lower surface comprising a plurality of substantially parallel elongated troughs disposed substantially longitudinally along the length thereof, each of said troughs having an outlet at the bottom thereof, wherein each said outlet is positioned adjacent to one of said front wall or rear wall and rearward of and over the path of travel of one of said cutting blades effective to dispense said material to said trench in the soil;

3) a plurality of screw augers, wherein one said auger is disposed in each of said troughs and said augers are adapted to transport said material in a direction along the length of said troughs toward said outlets;

4) an upstanding face plate disposed laterally between said side walls substantially perpendicular to said troughs and augers, and on the side of said outlets which is upstream from said direction of transport of said material in said troughs, said face plate defining first and second volumes within said receptacle, said first volume being upstream of said face plate relative to said direction of transport of said material, and said second volume being downstream of said face plate relative to said direction of transport of said material and encompassing said outlets;

5) said face plate comprising a bottom edge adjacent said troughs and an upper edge disposed above the uppermost radial edge of said augers, and said face plate further comprising a plurality of openings through which said screw augers pass;

wherein said material is provided in said first volume of said receptacle;

(B) cutting a plurality of trenches in the soil by drawing said soil cutting blades therethrough; and (C) dispensing said material into said trenches from said receptacle through said outlets.

22. The method of claim 21 wherein said material comprises poultry litter.

23. The method of claim 21 wherein said soil is selected from the group consisting of a pasture, tilled agricultural fields for crop production, no-tilled agricultural fields for crop production, and nurseries.

24. The method of claim 21 wherein said dispenser further comprises a cover plate extending over said second volume and said outlets and between the side walls.

25. The method of claim 21 wherein said plurality of substantially parallel troughs are disposed laterally across said lower surface of said receptacle.

26. The method of claim 21 wherein said inlet for said material is disposed to deposit said material into said first volume.

* * * * *